Figure 2:
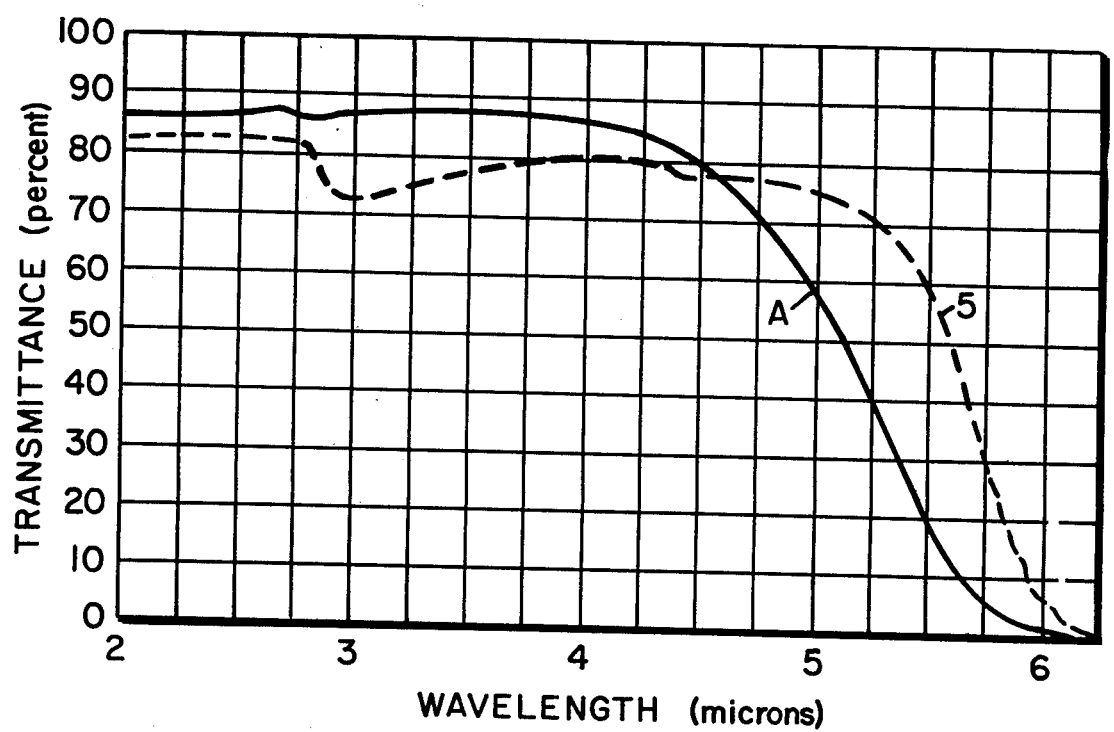

United States Patent [19]

Dumbaugh, Jr.

[11] 3,982,952

[45] Sept. 28, 1976

[54] INFRARED DETECTION SYSTEM AND WINDOWS USED THEREIN

[75] Inventor: William H. Dumbaugh, Jr., Painted Post, N.Y.

[73] Assignee: Corning Glass Works, Corning, N.Y.

[22] Filed: Oct. 7, 1974

[21] Appl. No.: 512,241

Related U.S. Application Data

[62] Division of Ser. No. 137,855, April 27, 1971, Pat. No. 3,911,275.

[52] U.S. Cl.............................. 106/47 Q; 106/47 R
[51] Int. Cl.². ......................................... C03C 3/00
[58] Field of Search................ 106/47 Q, 47 R, 73.2

[56] References Cited
UNITED STATES PATENTS

| | | | |
|---|---|---|---|
| 3,029,152 | 4/1962 | Milne | 106/47 Q |
| 3,119,703 | 1/1964 | Cleek | 106/52 X |
| 3,531,305 | 9/1970 | Dumbaugh | 106/47 Q |
| 3,715,221 | 2/1973 | Greco | 106/47 Q |
| 3,745,032 | 7/1973 | Miller et al. | 106/47 R |
| 3,769,047 | 10/1973 | Dumbaugh | 106/47 Q |

*Primary Examiner*—Patrick P. Garvin
*Assistant Examiner*—John F. Niebling
*Attorney, Agent, or Firm*—Clinton S. Janes, Jr.; Clarence R. Patty, Jr.

[57] ABSTRACT

An infrared detection system is described that embodies an improved glass window for transmitting infrared radiation to a heat sensitive detection element in the system. The window is produced from a glass consisting essentially, in percent by weight on an oxide basis, of 25–50% $GeO_2$, 10–50% $La_2O_3$, 5–50% $Ta_2O_5$ and 2–20% ZnO. Such glasses are hard and abrasion resistant, have moderate coefficients of thermal expansion and have a substantial transmission for infrared radiation in the wavelength range of five to six microns.

5 Claims, 2 Drawing Figures

INFRARED DETECTION SYSTEM AND WINDOWS USED THEREIN

This is a division of application Ser. No. 137,855, filed Apr. 27, 1971, now U.S. Pat. No. 3,911,275.

This invention relates to improvements in infrared detection systems. It is particularly concerned with a glass window for such a system that has a substantial transmission for infrared radiation in the 5 to 6 micron wavelength range.

Infrared detection systems, also referred to as heat detectors, are well known. Such systems have been devised, for example, by the railroads to detect overheating in rolling stock. In a somewhat different manner, such a detector may be used as a guiding or homing device in a missile system.

Infrared homing enables a missile to discriminate a target from the environment. A receiver in the missile embodies a heat-sensitive detector, such as a thermistor bolometer, whose electrical resistance is changed by the thermal effect of the infrared radiation received through an eye or window in the nose of the missile.

It is readily apparent that the effectiveness of a detector is dependent on the amount of radiation passing through or transmitted by the eye or window. Accordingly, glasses having maximum infrared transmitting characteristics are desired.

In addition, however, it has been found that the glass must have a moderate coefficient of thermal expansion to avoid fracture due to heat shock. Furthermore, the glass must be hard or abrasion resistant to resist the abrasive erosion caused by rain and other atmospheric elements at missile speeds.

There has been a continuing interest for many years in the development of glasses having improved transmission characteristics in the infrared portion of the spectrum. A primary concern has been the extension of the transmission cutoff point or line to longer wavelengths. In recent years, the application of these glasses in missile systems has introduced additional requirements as already indicated.

Initial needs in the field of infrared transmitting glass windows were met with silicate glasses. U.S. Pat. No. 3,531,306, granted in my name on Sept. 29, 1970, discloses such infrared transmitting silicate-type glasses. Characteristically, the transmission cutoff in these glasses occurs within the wavelength range of 4 to 5 microns.

In recent years, a need has developed for windows which transmit well at longer wavelengths, in particular within the wavelength range of 5 to 5.5 microns. The inability of silicate glasses to meet this need, and the consequent development of a family of calcium aluminogermanate glasses, are described in U.S. Pat. No. 3,531,305, also granted in my name on Sept. 29, 1970.

The infrared transmission characteristics of the glasses described in this latter patent are substantially improved over those of known silicate glasses. Nevertheless, there has been a continuing desire to further improve and extend transmission, particularly within the 5 to 5.5 micron range. Also, the unexpected abrasive erosion encountered on missile glass components has created a need to provide harder, more abrasion resistant glasses than the known calcium aluminogermanate glasses. It is, of course, desirable to achieve these improvements while maintaining other properties such as moderate coefficient of thermal expansion, resistance to devitrification, and otherwise good glass-working characteristics.

The problem of improved infrared transmission has also been addressed in U.S. Pat. No. 3,119,703, granted to Cleek et al. on Jan. 28, 1964. This patent discloses a family of $BaO-TiO_2-GeO_2$ glasses. The coefficients of thermal expansion of these glasses are generally above $80 \times 10^{-7}$ and, therefore, undesirably high, as far as resistance to heat shock is concerned. Also, such glasses may not be adequately hard for certain needs.

A companion application, Ser. No. 137,856, filed of even date herewith, now U.S. Pat. No. 3,769,047, discloses a family of lanthanum aluminogermanate glasses as infrared transmitting glasses having particularly good glass-working properties. The present invention is based on my discovery that the transmission cutoff line in the 5 to 6 micron range can be further extended in these glasses by minimizing the alumina ($Al_2O_3$) content and substituting other oxide components, in particular tantala ($Ta_2O_5$) and zinc oxide (ZnO).

Germanate glasses have been studied in the search for optical glasses having improved refractive index and nu values. In particular, U.S. Pat. No. 3,029,152, issued Apr. 10, 1962 to Milne and Parry, discloses a family of $La_2O_3-B_2O_3-GeO_2$ glasses which have high refractive indices and nu values and which may additionally contain BaO, $Ta_2O_5$, or $Nb_2O_5$. Also, Canadian Patent No. 802,128, granted Dec. 24, 1968 to N. V. Philips Gloeilampenfabrieken, discloses $BaO-ZnO-GeO_2$ glasses optionally containing $TiO_2$, $La_2O_3$, $ZrO_2$ and $Ta_2O_5$. These glasses are disclosed for use as the core member in a fiber optic unit. However, neither patent discloses the infrared transmission characteristics of its glasses and there is no known relationship between this property and the properties that are described in the patents.

It is a primary purpose of the invention to provide an improved infrared detection system. A particular purpose is to provide a glass window having improved infrared transmitting characteristics for use in such detection system. A further purpose is to provide infrared transmitting glasses having a substantial transmission in the wavelength range of 5 to 6 microns, as well as other desirable properties including a moderate coefficient of thermal expansion and good abrasion resistance.

To these and other ends, the invention is an infrared detection system comprising a thermally sensitive detection element and a glass window adapted to transmit infrared radiation to said detection element, said window being produced from a glass composed essentially, in percent by weight as calculated on an oxide basis, of 25–50% $GeO_2$, 10–50% $La_2O_3$, 5–50% $Ta_2O_5$, and 2–20% ZnO. The invention further contemplates, as embodiments thereof, a glass window for an infrared detection system and the novel glasses herein disclosed for production of such windows.

Figure 1:
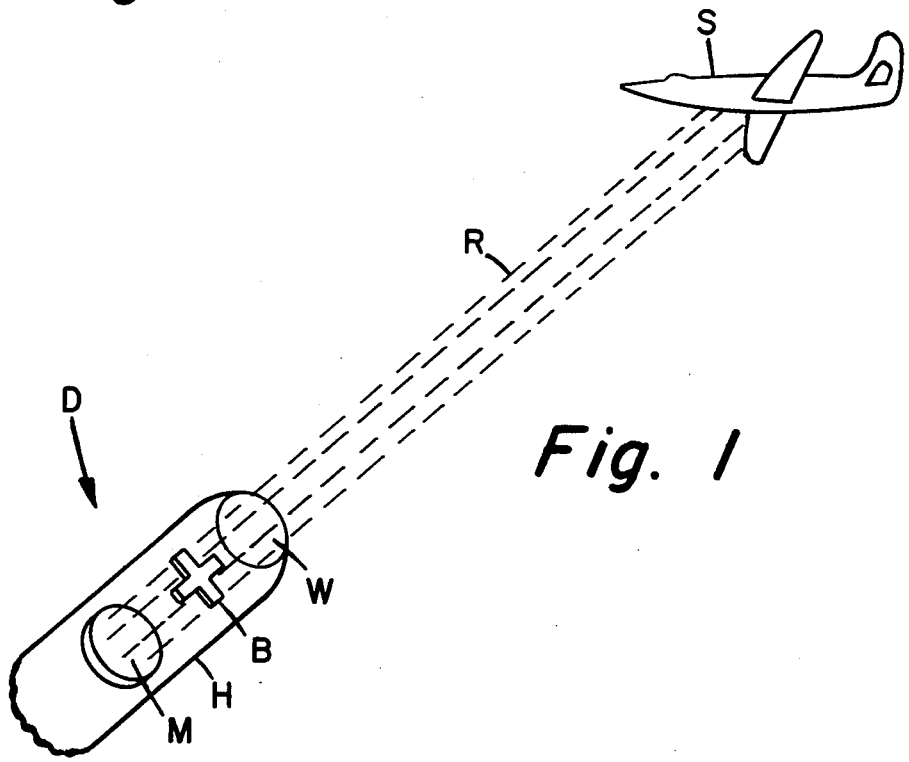

The invention is further described with reference to the accompanying drawings wherein FIG. 1 is a schematic illustration of an infrared detection system embodying a transmission window in accordance with the invention, and FIG. 2 is a graphical illustration of a characteristic property improvement of the invention.

In FIG. 1, infrared or heat radiation R, indicated by dotted lines, emanates from or is reflected by a source S. This may, for example, be a jet engine or automotive exhaust system. The radiation impinges on, and is transmitted in substantial degree by, glass window or eye W in the detection system generally identified by D.

Detection system D will, in well-known fashion, embody a detector, here illustrated as a bolometer B but not necessarily limited thereto. Conveniently, the system also includes a driven mirror M which collects and reflects transmitted radiation onto bolometer B. The latter may be a highly sensitive thermal device composed of a mixture of semiconducting metal oxides having a large temperature coefficient of resistance.

Signals generated by bolometer B due to impingement of radiation thereon may for example be transmitted to directional means (not shown) to direct or point the system toward the source S. The makeup and operation of the detection system is not further detailed since such systems are well known and the present invention is not concerned with these details.

The invention is primarily concerned with window W, shown mounted in the front or nose of housing H in detection system D. It is well known that detection equipment, such as bolometer B, as well as guidance and other electrical and sensing equipment, may require enclosure for protection against atmospheric influences. Accordingly, window W may require secure mechanical mounting, or even hermetic sealing, in housing H.

In accordance with the present invention then, window W is produced from a glass consisting essentially of 25–50% $GeO_2$, 10–50% $La_2O_3$, 5–50% $Ta_2O_5$ and 2–20% ZnO. Optional constituents include 0–10% $TiO_2$, 0–15% alkaline earth metal oxides, 0–40% $Nb_2O_5$, 0–5% $Al_2O_3$, 0–5% $ZrO_2$ and 0–20% PbO. Incidental amounts of other oxides may be present to the extent that they do not unduly influence the basic glass properties. In general, such other glass constituents serve no useful purpose and their intentional addition is avoided except as needed in glass melting or minor physical property adjustment.

Germania ($GeO_2$) is the primary glass forming oxide in the present glasses, and at least 25% is required for that purpose. The rather strong devitrification tendencies of the present glasses are lessened with increased $GeO_2$ contents. However, The $GeO_2$ level must not exceed 50% because infrared transmission, and particularly the location of the cutoff in the 5 to 6 micron range, progressively diminishes as the $GeO_2$ content increases. Therefore, the $GeO_2$ level selected for a given glass will generally represent a compromise between infrared transmission and glassworking properties.

Frequently, during working of low germania content glasses, devitrification will occur, but will be restricted to the glass surface. In that case, it may be possible to remove this defect by grinding and polishing the finished product. In this manner, lower germania contents may be employed.

Other glass forming oxides than $GeO_2$ include $SiO_2$, $B_2O_3$ and $P_2O_5$. In general, appreciable amounts of these oxides have a very strong depressing effect on infrared transmission, particularly in the 5 to 6 micron range. Accordingly, $B_2O_3$ must be completely avoided as should $SiO_2$ and $P_2O_5$ other than in impurity levels up to about 1%.

At least 10% lanthana ($La_2O_3$) is necessary to provide a hard, abrasion resistant glass. This component also improves the infrared transmission and extends the cutoff within the 5 to 6 micron range so that a content over 20% is preferred. Up to 50% of this oxide may be present before melting problems, particularly devitrification, become intolerable. However, it is preferred to employ below 40% to minimize these problems.

Other oxides, such as BaO and CaO, are known to improve infrared transmission in germanate glasses. However, I have found lanthana preferble for this purpose because, as compared to the other oxides, it increases the coefficient of thermal expansion of a glass to a much less degree when used in equivalent amounts. Further, lanthana improves the chemical stability of a glass.

Tantala ($Ta_2O_5$) depresses the thermal expansion coefficient of the present glasses while improving their physical hardness. Up to 50% may be present, but amounts over 30% tend to decrease the infrared transmission of the glasses.

Zinc oxide (ZnO) is necessary to form stable glasses. It is selected as a modifier because it has little apparent effect on infrared transmission properties. It should not be present in amounts greater than 20% because of difficulty in glass melting. It also increases the thermal expansion coefficient, but not to as great an extent as does $La_2O_3$.

The optional oxides may improve melting characteristics, stabilize the glasses, and/or modify viscosity characteristics. However, amounts larger than those indicated tend to unduly depress infrared transmission characteristics, increase expansion coefficient, or create melting difficulties.

The coefficient of thermal expansion in the present glasses appears particularly sensitive to the presence of divalent oxides other than zinc oxide, in particular baria (BaO) and lime (CaO). Accordingly, it is generally desirable to minimize these oxides to maintain a moderate expansion coefficient, that is less than $80 \times 10^{-7}/°C$. In any event, divalent oxides should be limited to less than ten percent for this purpose.

In general, the present glasses may be melted in conventional manner from ordinary glassmaking materials and worked in any customary manner. However, it is usually desirable to employ relatively pure raw materials in oxide form, and to melt the glasses in small electrically heated melting units.

The drying procedure described in U.S. Pat. No. 3,531,271, granted in my name on Sept. 29, 1970, may be employed. Briefly, this comprises adding part of the glass components to the batch in chloride form and melting the batch with a dry gas passing over the melt.

The invention is further described and illustrated with reference to the following table wherein several glass compositions within the invention are set forth in percent by weight on an oxide basis. Also set forth in the table are certain properties measured on the corresponding glasses, including (1) percent transmittance measured at wavelengths of 5 microns (%$T_5$) and 5.5 microns (%$T_{5.5}$) on a 2 mm. thick glass sample in a Perkin-Elmer Model 221 Infrared spectrophotometer, (2) thermal expansion coefficient (Exp.) in units/°C. $\times 10^{-7}$ as measured between 25° and 300°C. and (3) Knoop hardness ($KHN_{100}$) as measured in known manner.

TABLE

|  | 1 | 2 | 3 | 4 |
|---|---|---|---|---|
| $GeO_2$ | 32.2 | 36.4 | 36.5 | 37.3 |
| $La_2O_3$ | 38.0 | 25.3 | 37.9 | 32.2 |
| $Ta_2O_5$ | 17.2 | 25.7 | 17.1 | 17.5 |
| ZnO | 12.6 | 12.6 | 3.2 | 12.9 |
| $TiO_2$ | — | — | 3.1 | — |
| CaO | — | — | 2.2 | — |
| $\%T_5$ | 75 | 65 | 67 | 71 |
| $\%T_{5.5}$ | 59 | 35 | 39 | 44 |
| Exp. | 74.0 | 62.1 | — | 64.0 |
| $KHN_{100}$ | 555 | 543 | — | 555 |

|  | 5 | 6 | 7 | 8 |
|---|---|---|---|---|
| $GeO_2$ | 28.7 | 45 | 30 | 35 |
| $La_2O_3$ | 27.9 | 15 | 30 | 45 |
| $Nb_2O_5$ | — | 3 | — | — |
| SrO | — | 6 | — | — |
| $Ta_2O_5$ | 37.9 | 5 | 15 | 10 |
| BaO | — | 6 | — | — |
| PbO | — | — | 15 | — |
| ZnO | 5.6 | 17 | 10 | 10 |
| $ZrO_2$ | — | 3 | — | — |
| Exp. | 68.0 | 68.2 | 65.6 | 66.2 |
| $\%T_5$ | 62 | 58 | 66.5 | 69 |
| $\%T_{5.5}$ | 38 | 32 | 41 | 41 |

A half-pound glass batch, corresponding to each of the above compositions, was prepared by weighing oxide batch materials to the nearest 0.1 gram and mixing thoroughly. The mixed batch was placed in a platinum crucible and melted in an electrical resistance furnace for 2 hours at 1500°C. The melt was cast to form a 2 inch × 4 ½ inch slab, and this was annealed by cooling slowly from about 760°C. to room temperature.

The above melting procedure may be modified by including a small amount of a chloride material in the glass batch. For example, the CaO component of Example 3 may be introduced into the glass batch as calcium chloride ($CaCl_2$). Also, the melting procedure may be modified by blowing a dry gas, such as nitrogen, over the crucible during melting. In this manner, a "dry" glass may be produced in accordance with the teaching in my earlier patent.

By way of specifically illustrating a particular feature of the present invention, a glass having the composition of Example 5 in the table above is compared with a present commercial infrared transmitting glass A. The composition of the latter glass is: 43.2% $GeO_2$, 5.1% ZnO, 23.7% $Al_2O_3$, 13.8% CaO, 9.7% BaO, 4.4% Cl.

A 2 mm. thick window of each glass was prepared and percent transmission measurements at wavelengths over the range of 1.0–6.0 microns were made on the spectrophotometer identified above. The curves plotted from these data are shown in FIG. 2 of the appended drawings. The FIGURE is a graphical illustration wherein percent transmittance is plotted on the vertical axis and wavelength on the horizontal axis. It is apparent that the glass of the present invention provides a substantial improvement in the 5.0–6.0 micron portion of the spectrum.

I claim:

1. A glass exhibiting substantial transmission to infrared radiation in the wavelength range of five to six microns and having a coefficient of thermal expansion of less than $80 \times 10^{-7}$/°C. consisting essentially in percent by weight as calculated on an oxide basis from the glass batch, of 25–50% $GeO_2$, 10–50% $La_2O_3$, 5–50% $Ta_2O_5$ and 2–20% ZnO, and wherein $B_2O_3$, $SiO_2$, and $P_2O_5$ are absent except as in impurity levels up to about 1% and divalent metal oxides other than ZnO, if present, are present in amounts less than 10%.

2. An infrared transmitting glass in accordance with claim 1 and additionally containing up to 10% $TiO_2$.

3. An infrared transmitting glass in accordance with claim 1 wherein the $La_2O_3$ content is 20–40%.

4. An infrared transmitting glass in accordance with claim 1 wherein the $Ta_2O_5$ content does not exceed 30%.

5. An infrared transmitting glass in accordance with claim 1 consisting essentially of 37.3% $GeO_2$, 32.2% $La_2O_3$, 17.5% $Ta_2O_5$ and 12.9% ZnO.

* * * * *